Feb. 16, 1926.  1,573,567
C. R. NICHOLS
CENTRIFUGAL PROCESS OF FORMING AND FINISHING HOLLOW BODIES OF
PLASTIC MATERIALS AND APPARATUS THEREFOR
Filed Oct. 28, 1925  3 Sheets-Sheet 1
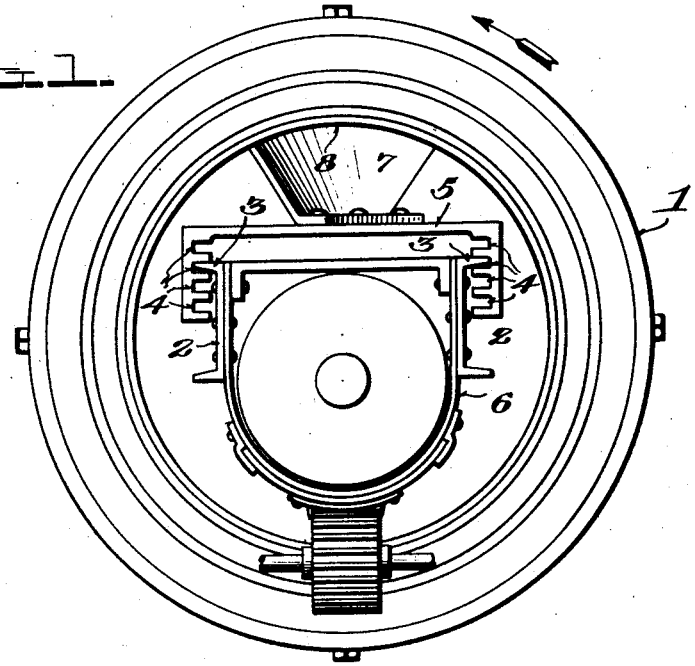
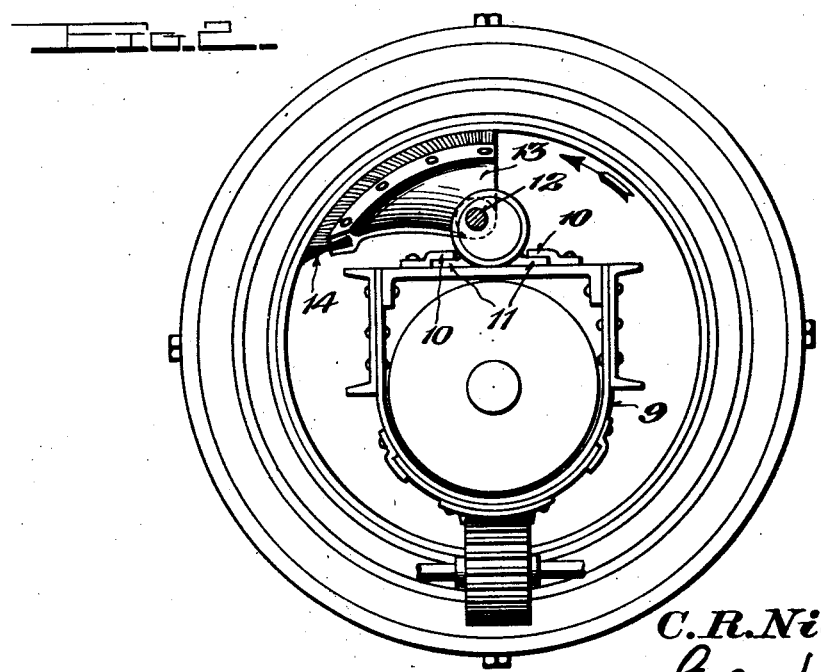
Inventor
C. R. Nichols, Feb. 16, 1926.
C. R. NICHOLS
1,573,567
CENTRIFUGAL PROCESS OF FORMING AND FINISHING HOLLOW BODIES OF
PLASTIC MATERIALS AND APPARATUS THEREFOR
Filed Oct. 28, 1925   3 Sheets-Sheet 2
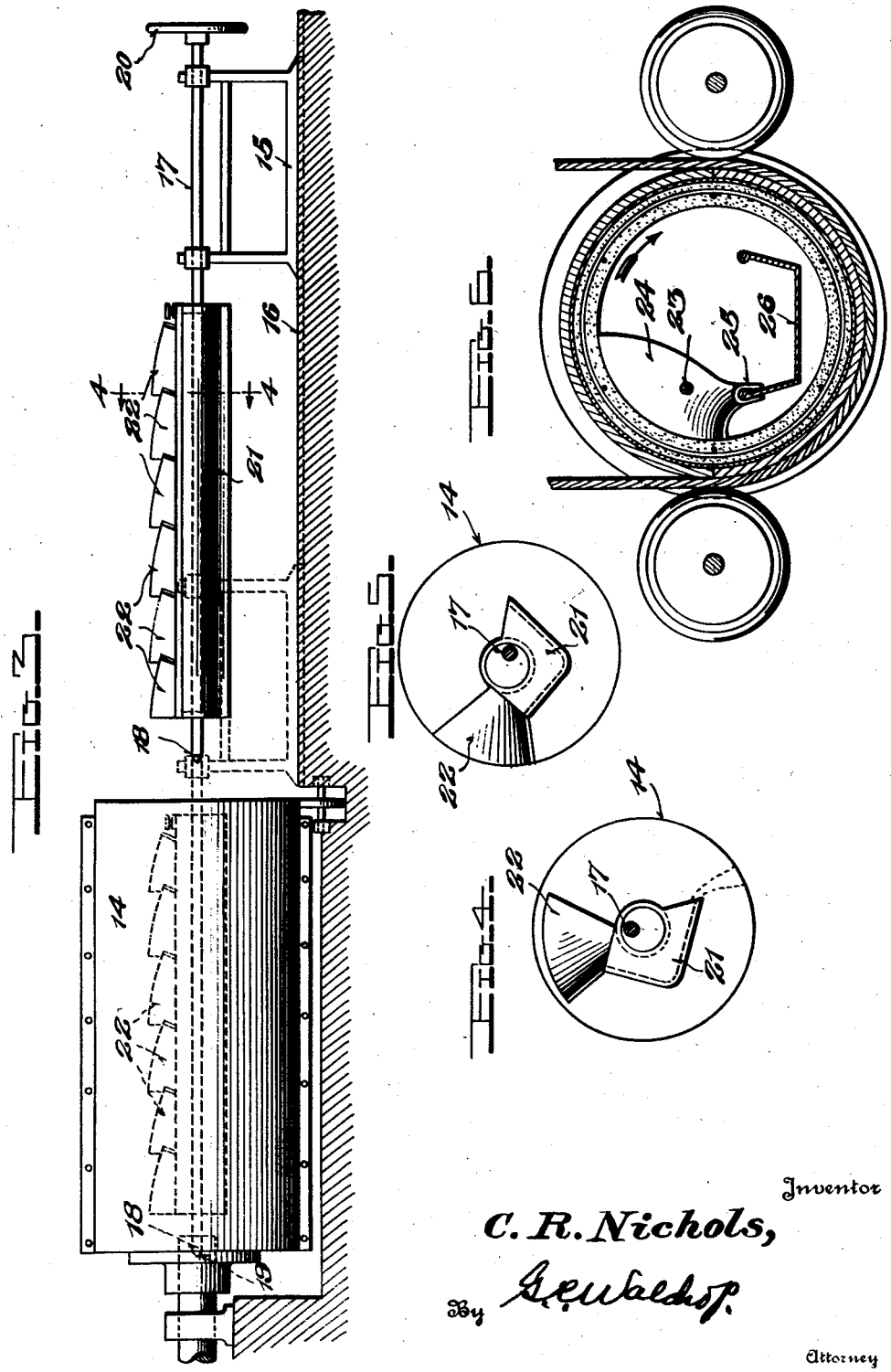
Inventor
C. R. Nichols,
By
Attorney

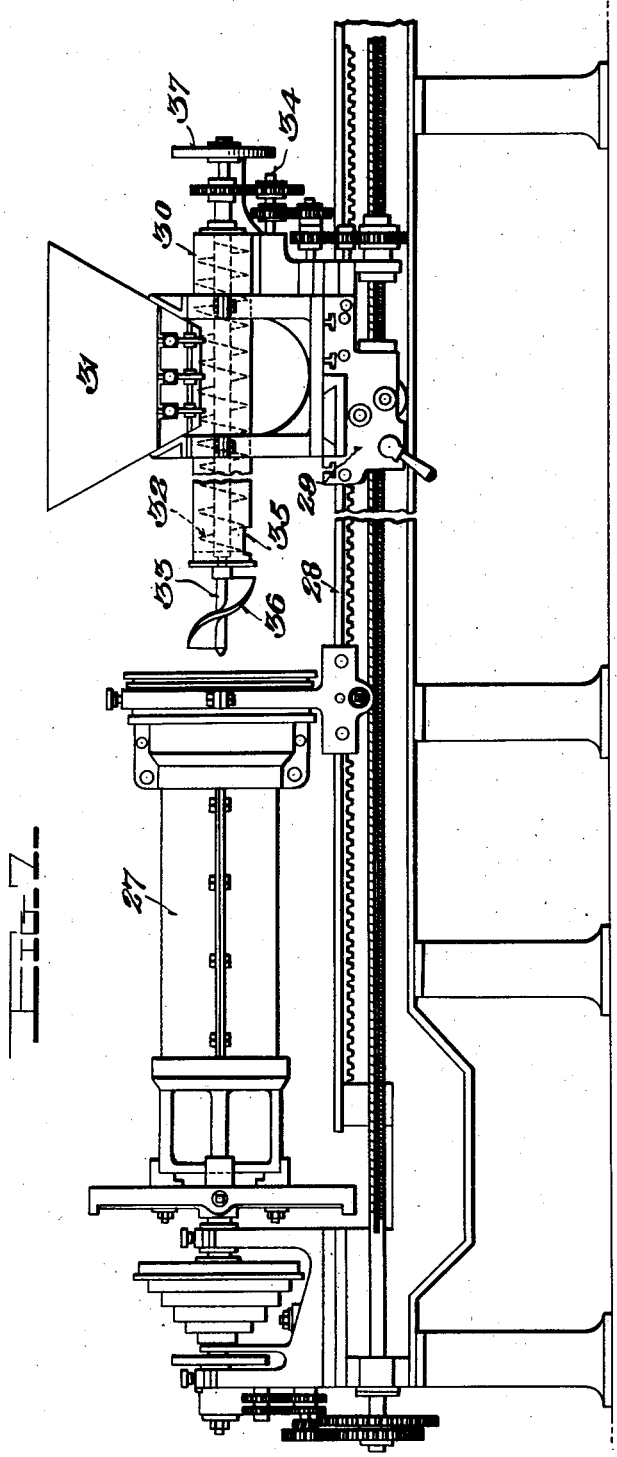

Patented Feb. 16, 1926.

1,573,567

UNITED STATES PATENT OFFICE.

CLIFFORD R. NICHOLS, OF DETROIT, MICHIGAN.

CENTRIFUGAL PROCESS OF FORMING AND FINISHING HOLLOW BODIES OF PLASTIC MATERIALS AND APPARATUS THEREFOR.

Application filed October 28, 1925. Serial No. 65,483.

*To all whom it may concern:*

Be it known that I, CLIFFORD R. NICHOLS, a citizen of the United States, residing at Detroit, in the county of Wayne and State of Michigan, have invented certain new and useful Improvements in Centrifugal Processes of Forming and Finishing Hollow Bodies of Plastic Materials and Apparatus Therefor, of which the following is a specification.

This invention relates to a process of and apparatus for manufacturing and lining articles, such for example as pipe and other hollow ware with plastic material, wherein centrifugal force is used for compacting, solidifying or densifying and finishing the surface of the body formed.

Many efforts have been made to successfully manufacture such articles and I have experimented with and tested various theories, processes and machines for manufacturing hollow concrete bodies. All prior efforts to obtain the desired results by utilizing centrifugal force, so far as I am aware, have encountered many disadvantages and are unsatisfactory and have failed to produce an article of the best quality and value, when composed of the aggregate ordinarily found in various communities.

Early experimenters, in using centrifugal force for forming and densifying a plastic mass into hollow bodies, used a large volume or percentage of water mixed with the aggregate to make the mass more plastic or fluent, that it might be the more readily handled, since by the action of centrifugal force the surplus water could be separated from the mass. To accomplish this latter, cylinders or moulds were employed, having wall structure permitting the surplus water to be extruded therethrough during the rotation of the mass.

The surplus water was thus readily enough removed but the water extruded in this manner washed and carried with it many of the finer particles of the cement from the mass and out of the mould, leaving fissures or seams which greatly reduced its strength. These methods were found unsatisfactory and abandoned.

Subsequently moulds or forms which retained the water within the mould were used. With moulds of this character, the water, being lighter than other elements of the mass, was forced to the inner surface of the body. The movement of this volume of water through the body of the mass had the same objectionable action upon the cement, that is, washed or floated it to the inner surface of the mass.

Efforts were then directed toward removal and disposition of this surface water and many experiments were made trying to accomplish this purpose. Other efforts were directed to the building of the entire wall thickness of the formed body, progressively from one end of the form, the excess water being driven ahead of the advancing wall, but due to the fact that as the surplus of water accumulated the mass became increasingly fluent, the result was a product formed of a thin and excessively wet mass at one end which rendered the completed article entirely out of proportion as to mass consistency. This method also went into disuse because products of uniform density or consistency could not be produced thereby.

Still later it was proposed to use relatively dry admixtures which were introduced into the moulds or forms and then pressed or packed mechanically from the inner surface of the mass in connection with centrifugal action. With the dry mass used in these efforts smooth and even placement and distribution of the mass in the wall body could not be obtained and various means, such as rollers and beaters were used in efforts to smooth the surfaces of the product and to obtain an even thickness of the wall thereof. These efforts, were unsuccessful in that they failed to produce a product of even density, uniform wall thickness, smooth inner surface or the desired distribution, placement and set of the mass.

Of all the efforts that have been put forth dealing with masses of material of varying moisture content or degree of saturation, together with instrumentalities for removing the excess water and deleterious matter which collected on the inner periphery of the body being formed, none have taken into account the vital relationship existing between the water content, speed control and specific gravities of which the plastic was composed.

There is in all gravels and sands either mud, clay or deleterious materials which vary as to specific gravity, some particles being heavier and some lighter than the cement used. Consequently, when this material is used in forming articles by centrifugal force, the particles lighter than the cement will come to the inner surface, assisted by flotation with the water as the body is rotated. The lighter particles are ahead of the heavier particles or cement, thus leaving a rough and pitted interior, which is very objectionable in water or sewer pipe, where uniform smoothness of surface or periphery is required. It is obvious that if concrete composed of a cement and a very clean aggregate of the same specific gravity is available, at certain speeds, a uniform composition of the body can be obtained in the finished articles. It would only be necessary to exert sufficient centrifugal force to compact the mass. This would force the water from the voids, and as a water-tight form is used the water not being able to go further than the form surface as the mass is taking its centrifugal place, it is natural that as centrifugal force compacts the mass, the water will be forced to the inner periphery of the article being formed. If a great amount of water is used in the mixture of the aggregates to make the concrete mixture more fluent, it is natural that there will be more water to extract and force through the body. The excess water compels the use of relatively low densifying centrifugal pressure which leaves a great percentage of voids in the body, or if the speed of the rotating member is accelerated sufficiently to secure the necessary density, then the water is forced to the inner surface so rapidly and in such quantity that a great amount of the fine particles of cement are floated by, and in turn removed with it from the body, thereby causing a much weaker structure than would be obtained by using less water. It has been proposed to use a plastic mass as above described and to assist centrifugal action by dumping from a trough longitudinally throughout the conforming member simultaneously, depending on slow rotation to distribute the plastic material uniformly, longitudinally and circumferentially. This necessitates a mixture of relative wet consistency, and at the proper densifying speed, a considerable amount of cement is brought to the surface and lost with the water.

The methods above described have been used in general practice and manufacturers have tried to utilize slow rotation in combination with detrimentally wet plastic material to attain a uniform wall thickness and inner surface.

It has been also proposed to remove the deleterious or lighter particles and excess water by various means such as rollers, straight edges, brushes, etc. I have found that after sufficient centrifugal force is exerted to properly densify the body and bring these light particles to the surface, which at the proper time for removing the lighter particles and water, has a sensitiveness that will not permit of troweling or scraping, without scarifying or scratching its surface to such an extent that it will weaken the structure and roughen its surface. My process contemplates the circumferential and longitudinal floating of this water with the lighter particles across the periphery of, and out of the forming body.

I have discovered that the water content of concrete for centrifugal casting, is as important as the water content for concretes cast by other methods. Probably the correct water content is more important in centrifugal casting, due to the water being forced through the plastic or aggregate to the inner surface of the body during densification, which would have the tendency to carry with it the fine cement when an excessively wet concrete or plastic was used. In numerous experiments to find the relation between the peripheral speed and the water content of the concrete, I have, when using a concrete of a water content ordinarily used in forming centrifugal pipe, been able, by attaining high peripheral speed—say 4000 feet per minute, to extract a great portion of the cement with the water, while by using the same peripheral speed with a concrete of a relatively low water content, I have been unable to extract or bring with the water any of the fine cement particles.

It should be understood that the full benefits of centrifugal force in such casting in its relation to the water content and varying specific gravity of elements of the plastic mass, may be realized only when a supplemental mechanical means is used in combination therewith. The function of this mechanical means is to aid or cooperate with centrifugal action in the proper distribution or placement of the plastic mass within the mold; to assist such action in the finishing of the inner circumference of the product and move residual substances from the inner surface of the completed body.

A relatively dry mass will not readily run or flow across or upon the conforming surface of the mold or forming body when the mold is being rotated at suitable charging speeds. The mechanical means acts to engage with the plastic material and aids in its even distribution or placement.

In practice I have found that the aggregate in different localities varies as to specific gravity; that in one locality the gravel and sand may be composed of particles of gravel of varied weights or specific gravity and that in another of particles of fairly uniform weights or specific gravity; that in one locality there may be a gravel with quite a per cent of its particles lighter than the cement used and in another all particles may be heavier than the cement used.

The primary object of the invention is to provide a process which enables hollow articles to be easily and quickly produced by centrifugal action of the plastic mass and to remove water and such deleterious matter as may be inherent to the mass and to finish the interior of the article.

Briefly, the present invention resides in centrifugally rotating the plastic mass within a mold, distributing the same by simultaneous longitudinal and circumferential movement and in utilizing the deleterious matter to assist in finishing the product by moving same both longitudinally and laterally of the product, thereby to cause such matter in its said movement to help smooth, even, polish and finish the product interior, followed by complete removal of the deleterious matter upon completion of the process.

In the drawings:—

Fig. 1 is an end elevation of the invention applied to the rotary mold of my Patent No. 1457185 of May 29, 1923;

Fig. 2 is a like view of a modified form of the invention;

Fig. 3 is a side elevation of a further modified form of the invention;

Fig. 4 is a section on line 4—4 of Fig. 3;

Fig. 5 is a view similar to Fig. 4, but showing the parts in a different position;

Fig. 6 is a transverse section of a still further modified form of the invention; and Fig. 7 is a side elevation of still another modified form of the invention.

In proceeding in accordance with the present invention the rotary mold 1 depicted in Fig. 1 is provided with charging mechanism embodying a trough 6 to the sides of which channel beams 2 are affixed. The upper flanges 3 of the beams 2 selectively engage in corresponding longitudinal grooves 4 formed in sides of a carrier 5, the latter being slid endwise into engagement with the flanges 3. A curved blade 7 is secured to the carrier 5 and has its peripheral edge 8 curved so as to conform to the inner circumference of the body to be formed. The blade 7 constitutes a combined plastic mass distributer and evening, polishing and finishing means and also a means for removing excess water and deleterious substances or material. The body shape of the blade is somewhat that of a segment of a screw or spiral conveyor so as to function to progressively move the plastic mass longitudinally of the mold, simultaneously with rotation of the latter.

In Fig. 2, the trough is provided at its top with guides 10 receiving a slide 11 therebetween. The slide 11 carries an eccentrically mounted shaft 12 to which latter a curved blade 13 carrying a curved brush 13ª is rigidly affixed.

In Fig. 1 it will be noted the blade can be moved by adjustment of the carrier grooves and with respect to flanges 3 to vary the relation of the blade radially of the mold, while in Fig. 2, the same results are effected by turning of the eccentric on which shaft 12 is mounted. In both forms the blade is movable axially of the mold.

In Fig. 3 the mold 14 receives therein the charging, distributing, and finishing device, which latter is mounted on a carriage 15 slidable on a track 16. This device is composed of a shaft 17 the end 18 of which is engageable in a seat 19 at an end of the mold 14. The shaft 17 has a handwheel 20 by which it may be turned. A trough 21 is eccentrically carried by the shaft and has a series of blades 22 similar to the blades of Figs. 1 and 2 mounted thereon. Any number of blades may be used as desired, or but one if so preferred.

In this form of the invention, the plastic mass is placed in the trough 21 in the outside position of Fig. 3, and then moved to occupy the position indicated by the dotted lines in Fig. 3. Whereupon the shaft 17 is turned to cause the trough to take the discharge position indicated by Fig. 4, thereafter the shaft being turned to bring the placement and finishing members 22 into the position indicated by Fig. 5, to thus effect longitudinal movement and lateral placement of the material as desired.

In Fig. 6 the blade 24 is slidably mounted upon any support such as the edge of trough 26 as indicated at 25. A shaft 23 is affixed thereto by which the blade or brush 24 is manually positioned longitudinally and laterally of the mold whereby movement of the material is effected as desired.

In Fig. 7 the mold 27 is mounted on a machine bed 28, the latter also supporting a carriage 29 slidably adjustable on the bed. A charging cylinder 30 is mounted on the carriage and has a charging hopper 31 thereon, the cylinder being provided with a screw 32 on its interior which is driven by gearing 34 of the machine. Cylinder 30 has a discharge 35 at its front, while the shaft 33 is equipped with a spiral blade 36 disposed exteriorly of the cylinder. The cylinder is of a length to extend throughout that of the mold, while the shaft 33 is eccentrically mounted through screw 32 and has a hand wheel 37 to enable the blade 36 to be adjusted radially of the mold as in the other forms of the invention. The cylinder 30 is projected into the mold and the plastic mass entering the cylinder from the hopper 31, is mixed or agitated and egresses from the outlet 35, into the mold. The blade 36 is then manipulated by rotation of the hand wheel 37 to control the internal diameter of the product and by sliding of the carriage 29 on bed 28, the desired action of the blade on the plastic mass is controlled.

In all forms of the invention, the blade or blades function to longitudinally distribute the plastic mass so that same is uniformly placed throughout the mold length and by lateral movement to not only enable the radius of the internal diameter to be controlled but also to enable gradual building up of the thickness of the body and at the same time to even, polish and finish the inner circumference and remove all deleterious matter. The blades may be of yielding or nonyielding material or brushes as desired.

It is particularly to be noted that by use of the present invention, the operator can freely observe the action of the material from the open end of the mold and by manipulation of the blade both by axial sliding and lateral movement, control the plastic mass to a nicety. It is obvious that any number of blades may be employed in any structure as desired.

The removal of the deleterious matter is of vital importance and in accordance with the present invention, it will be noted that such matter is removed by simultaneous movement thereof longitudinally and laterally of the inner circumference of the body being formed. This movement of the deleterious matter therefore causes such matter to help smooth, even, polish and give a uniform finish to the inner circumference of the body.

The finishing, smoothing, and polishing of the interior surface of the formed body is greatly facilitated by the gradual longitudinal movement of the surplus water across the entire inner surface of the body whereby the lighter particles brought to the surface as deleterious materials are washed or floated along with and by the water and impelled longitudinally of and out of the body by the controlling means. In the finishing step, the front end of the controlling means constituted of one or a plurality of the blades, is first introduced within the body and as the means is moved longitudinally of the body, the means upon movement to or through the end of the body effect final or complete removal of all water and deleterious matter out of the body.

The essential elements required to practice the present invention are:

1. Forms which remain water-tight throughout the operation—preferably of one-piece construction,—in any event forms that have joints or seams tightly sealed.

2. Means for imparting rotation to the form, whereby the speeds may be controlled and varied at will.

3. Means to assist and co-operate with centrifugal action in placing the material in the rotating mould and evening and finishing of the body formed, whereby any desired portion of the plastic mass or its centrifugally separated elements may be moved longitudinally and circumferentially of and during rotation of the body, which means is readily adjustable to function with any varying internal diameter of the body during varying speeds of rotation.

By co-ordinating these essential elements with the requisite amount of water, I am able to produce a pipe of the desired density having uniform wall thickness throughout and possessing an inner circumferential surface that is smooth, even and polished. Furthermore, I am able to produce this result, utilizing ordinary commercial rock, gravel, sand and cement, available in general concrete construction in all localities. I am further able to produce a pipe having any desired number of annuli and to cause the cement content, of each annulus, to take a desired position within the annulus or upon its inner surface, thus producing a superior article having either uniform distribution of the cement within the wall of the body, or alternating annuli of rich and lean cement content. I am further able to remove from the densifying mass during rotation, the deleterious material and excess water originally contained therein, and at the same time to utilize same as an aiding agent in finishing the product.

The separation or positioning of the elements composing any annulus of the plastic mass, as is readily understood by those skilled in the art, is accomplished by controlling and regulating the centrifugal action to which the same is subjected.

This application is a continuation in part of my application filed April 20, 1925, Serial Number 24,626.

What is claimed is:—

1. In a centrifugal plastic ware machine, the combination of a rotary mold, mold charging means and means carried by the charging means for aiding centrifugal action in simultaneous longitudinal and circumferential placement of the plastic material within the mold.

2. In a centrifugal plastic ware machine the combination of a rotary mold, mold charging means, means supported by the charging means for distributing the plastic material within the rotating mold and means for effecting movement of the distributing means to build up the body in a series of controlled superimposed annuli.

3. In a centrifugal plastic ware machine, a rotary mold, material feeding means, means supported by the feeding means for placing the material in the mold to form the wall of the body in a series of superimposed annuli and for also moving superfluous material and water across the inner circumference of the body and out of the mold.

4. In a centrifugal plastic ware machine, the combination of a rotary mold, mold charging means, means carried by the charging means for aiding centrifugal action in simultaneous longitudinal and circumferential placement of the plastic material within the mold, and means to permit of movement of the placement means independent of the charging means.

5. In a centrifugal plastic ware machine, the combination of a rotary mold, mold charging means, means carried by the charging means for aiding centrifugal action in simultaneous longitudinal and circumferential placement of the plastic material within the mold, and means to permit of both lateral and longitudinal movement of the placement means independent of the charging means.

6. In a centrifugal plastic ware machine, the combination of a rotary mold, mold charging means, means carried by the charging means for aiding centrifugal action in simultaneous longitudinal and circumferential placement of the plastic material within the mold, and for smoothing and finishing the inner surface of the ware, and means to permit of movement of the placement means independent of the charging means.

7. The process of forming, densifying, smoothing and finishing a hollow body composed of plastic material by cooperating with centrifugal force, consisting of rotating a hollow conforming member, introducing plastic material therein, distributing the material simultaneously circumferentially and longitudinally within the rotating member and removing deleterious material from the inner periphery of the forming body by simultaneous circumferential and longitudinal movement thereof.

8. The process of forming and finishing plastic material into hollow articles by aiding centrifugal force which aid consists in uniformly controlling the plastic material throughout its length and its varying inner diameters as the article is formed.

9. The process of controlling the deleterious matter forming upon the inner periphery of a rotating plastic body consisting of moving said matter circumferentially and longitudinally across and from the inner surface of the body as brought to the surface of the latter by centrifugal action.

10. The process of manufacturing hollow bodies centrifugally consisting of rotating plastic material and moving a part of said material longitudinally of the inner periphery of the body.

11. The process of building up a hollow body consisting of introducing plastic material into a rotating member, and moving a part of the plastic material across the varying circumferential inner periphery of the body being formed.

12. The process of eliminating an annulus of plastic or deleterious material from the inner peripheral face of a hollow rotating body, which consists in moving said annulus simultaneously, longitudinally and circumferentially across the inner surface of and out of the body.

13. The process of centrifugally building a body of hollow ware into annuli of varying cementitious content of plastic material from a mass of plastic material that is initially of uniform cementitious content, consisting of placing a charge of the material into a mold and rotating the latter at a slow speed to form an annulus and of adding a subsequent charge of the material and rotating the mold at a higher speed to form a second annulus.

14. The process of centrifugally manufacturing hollow ware of plastic material consisting of shifting material, simultaneously longitudinally and circumferentially upon any predetermined point of the inner surface of ware being formed during rotation of the latter.

15. The process of forming densifying, smoothing and finishing a hollow body composed of plastic material by cooperating with centrifugal force, consisting of rotating a hollow conforming member, introducing plastic material therein, distributing the material simultaneously circumferentially and longitudinally within the rotating member and removing deleterious material from the inner periphery of the forming body by circumferential and longitudinal movement thereof.

16. The process of surfacing the inner face of a hollow rotating body with plastic material consisting of, distributing the plastic material simultaneously longitudinally and circumferentially upon the inner face of the body.

17. In a centrifugal plastic ware machine, a rotary mold, mold charging means, and means adjustable independently of the charging means, coacting with the rotation of the mold to effect the simultaneous, longitudinal and circumferential placement of the plastic material within the mold.

In testimony whereof I affix my signature.

CLIFFORD R. NICHOLS.